Patented Oct. 15, 1929

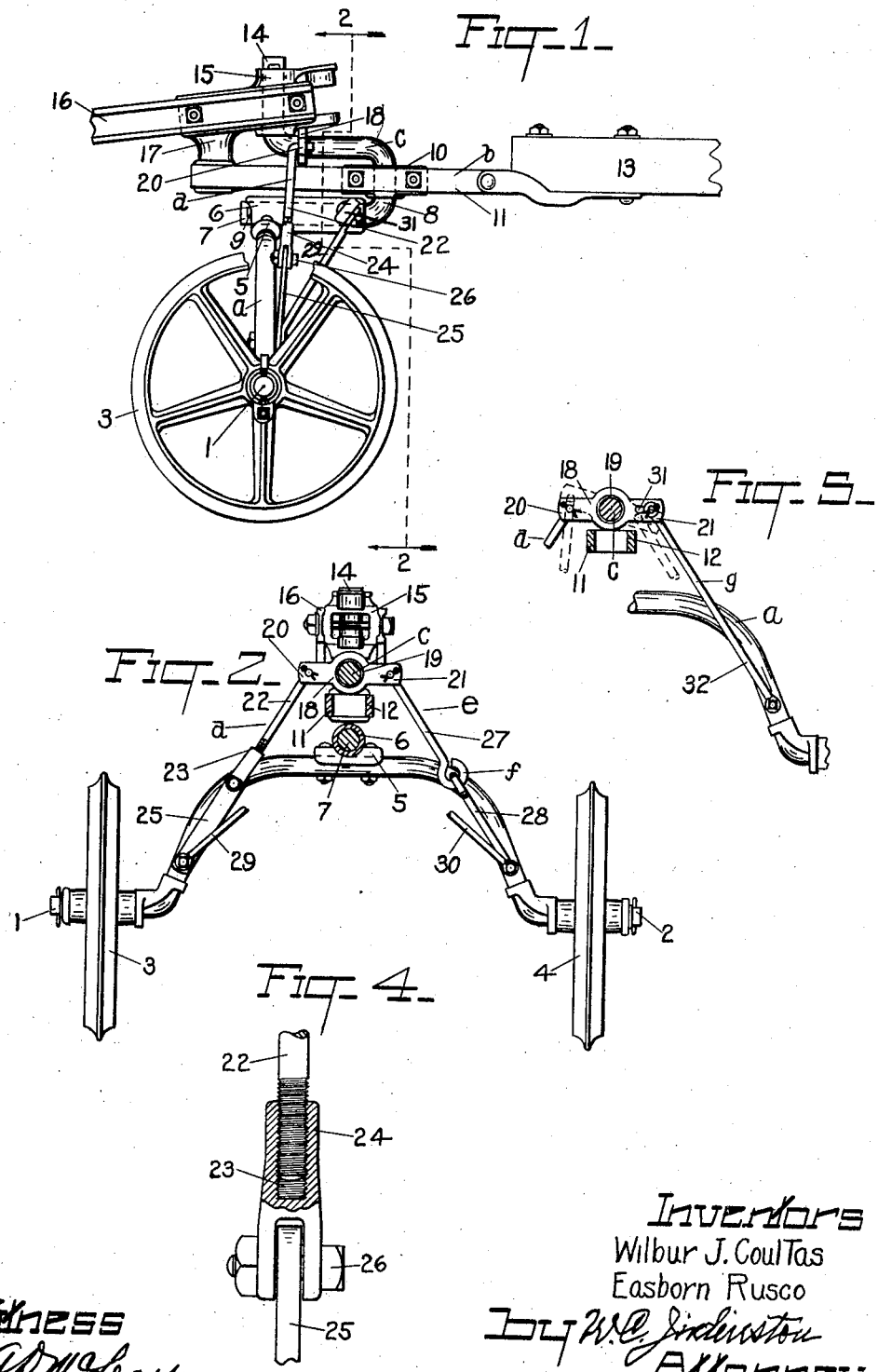

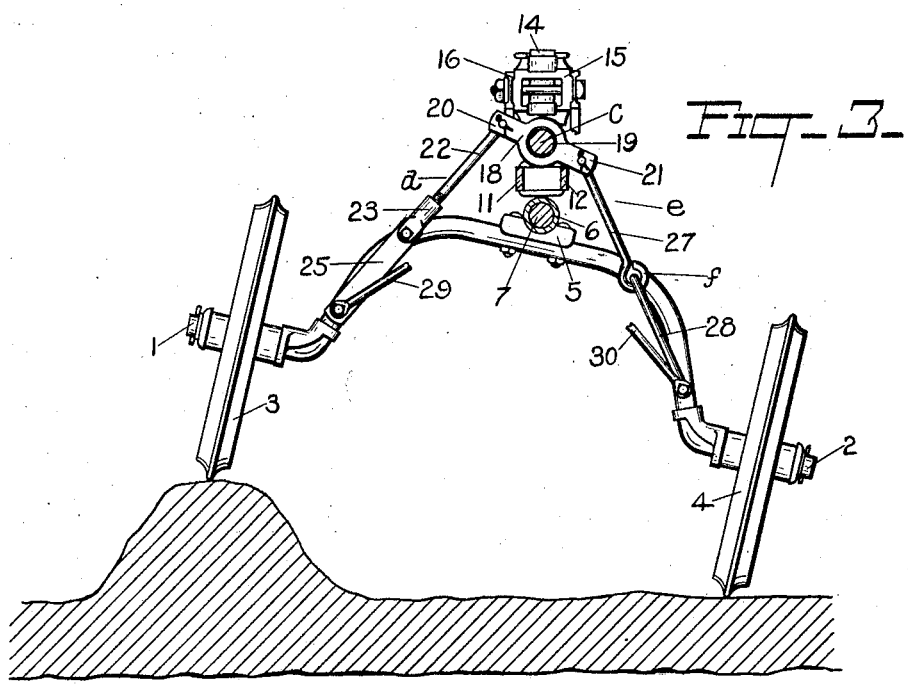

1,731,707

UNITED STATES PATENT OFFICE

WILBUR J. COULTAS AND EASBORN RUSCO, OF MOLINE, ILLINOIS, ASSIGNORS TO DEERE & COMPANY, OF MOLINE, ILLINOIS, A CORPORATION OF ILLINOIS

POLE OR TONGUE TRUCK

Application filed January 23, 1928. Serial No. 248,678.

Our invention relates to pole or tongue trucks used more particularly in certain types of agricultural machinery, and an object of our invention is to provide a means for automatically limiting tilting movement of the truck which, under certain conditions of the ground surface, is liable to occur.

Referring to the accompanying drawings, in which similar numerals indicate identical parts—

Fig. 1 is a side elevation of a truck supporting the tongue of a machine and embodying our invention, part of the nigh wheel being broken away;

Fig. 2 is a section on the line 2—2 of Fig. 1;

Fig. 3 is a view similar to 2, but with the truck tilted;

Fig. 4 is an enlarged detail, partly in section, of a pivotal connection, and

Fig. 5 is a modification of part of our device.

The type of truck shown is well known in the art, and comprises a vertically disposed arch axle $a$, having the ends thereof bent to provide horizontal spindles 1 and 2 upon which are journaled wheels 3 and 4. To the apex of the arch axle is rigidly secured a casting 5, and integral therewith is a sleeve 6 turnably mounted on a horizontally and rearwardly extending arm 7 of a vertically disposed crank member 8, and secured thereon by a pin 9. The bend of the crank member is pivotally journaled in a bearing 10 secured between parallel bars 11 and 12 of a pole frame $b$, which is formed preferably of a bar bent centrally and having its ends rigidly attached to a draft pole 13. From the bend the upper arm $c$ of the crank member 8 extends rearwardly in parallelism with the part 7 and terminates in a vertical portion 14 rotatably mounted in a bearing in a casting 15 secured to the forward end of a stub tongue 16 supposed to be attached to a vehicle not shown. A depending part 17 of the casting 15 is pivotally held in the bend of the pole $b$.

As the sleeve 6, rigidly secured on the axle $a$, is freely turnable on the part 7 of the crank member 8, it is apparent that the truck has a vertically swinging or tilting movement, which we find necessary to limit for a reason hereinafter explained.

This limiting device consists of a horizontally-disposed rocking member 18 having an opening 19, central of its length, through which the arm $c$ of the crank member 8 extends. Arms 20 and 21, oppositely disposed and part of the member 18, are perforated at their ends to receive the hook ends of flexible connections $d$ and $e$, the hook ends of which are secured in place by suitable pins or cotters.

The connection $d$ is composed of a link 22 having its lower end threaded to fit in a threaded socket 23 in a casting 24. The lower end of the casting 24 is bifurcated to receive the upper end of a link 25, which is secured in place by a bolt 26 about which the links pivot; the lower end of the link 25 is pivotally secured to the arch axle $a$ adjacent and above the bend of the spindle 1. It is obvious that this construction may be lengthened or shortened by releasing the link 22 from the arm 20 of the rocking member 18 and turning the link in the desired direction in the socket of the casting 24. The connection $e$ is similar in length to the connection $d$, and is composed of links 27 and 28, which are hooked together at $f$; the lower end of the link 28 is bolted to the arch axle at a point similar to the attachment of the link 25 thereto. Braces 29 and 30 are secured to the arch axle $a$ by the bolts, which attach the links 25 and 28 thereto; the braces 29 and 30 converge upwardly, and are bolted to lugs 31 on opposite sides of the sleeve 6, one only of said lugs being shown. As previously stated, the connections $d$ and $e$ are flexible, but in Fig. 5 we have shown a connection $g$ formed of a single rod, one end of which is hooked in a slot 31$^a$ in the arm 21 of the member 18, and the lower end is attached to the lower portion of the arch axle $a$, the connection $g$ in this event being similar to the connection $d$ shown in Figs. 1, 2 and 3, the slot 31 substituting as a joint and providing the desired degree of flexibility together with economy in manufacture.

We find it is necessary that the truck shall have rocking movement laterally to travel over an irregular surface, and it is also essential that this rocking movement be limited, for if one of the wheels should meet with a large clod or hummock and roll over it without means to limit the rise of the wheel, it may be difficult to return the latter to its primal position because of the down pressure, on the other wheel, from the weight of the machine to which the truck is attached. Then again a similar condition may arise if one of the wheels should drop into a hole or depression, either of which positions is illustrated in Fig. 3, for it is obvious that Fig. 3 also illustrates the position of the truck if the wheel 4 was in a depression and the wheel 3 on level ground.

When traveling on level ground, the truck and connected parts are as shown in Figs. 1 and 2; now, if, as illustrated in Fig. 3, the wheel 3 should ride up over an obstruction, such as a large clod or hummock, the opposite wheel 4 remaining on a level surface, the rise of the wheel 3 will tilt the axle $a$ and raise the pole 13, the tongue 16 and connecting parts, and as they rise the member 18 will move upwardly, but as the member 18 is connected with the axle $a$, adjacent the wheel 4, by the flexible connection $e$, it follows that the member 18 will be rocked by the pull of the connection $e$ until the arm 21 contacts with the bar 12 and consequently arrests the tilting movement of the axle $a$. The action of the parts would be similar if the axle should be tilted by the wheel 4, the member 18 rocking until it contacts with the bar 11, by pull of the flexible connection $d$, and thus limiting the tilt of the axle. It will be noticed that the rocking member 8 has been so located, with respect to the pivoted bend of the crank member 8 and the part 17, that its relative position to those parts is substantially constant whether the truck should be traveling ahead or turning to another direction, so that the operation of the member 18 limits the tilt of the truck by contact with the bar 11 or the bar 12 irrespective of the position of the truck whether traveling ahead or turning to a new direction.

It is recognized that the connections $d$ and $e$ may be made of single rods. It has been found, however, that flexible connections are more desirable on account of the surface conditions over which the trucks must travel.

What we claim is—

1. In a wheeled body having a stub tongue to which a pole frame is pivotally connected to swing laterally, the combination therewith of a truck comprising an axle and supporting wheels, a rotatable member pivotally connecting said axle with the stub tongue and pole frame and cooperating with the latter to steer the truck by lateral swinging movement of the pole frame, said axle pivotally mounted on said member and tiltable laterally of the line of draft, a rockable member mounted on the rotatable member, arms extending in opposite directions from the rockable member, and means connecting said arms with the axle whereby said member rocks simultaneously with the tilting movement of the axle and limits the tilting movement thereof by contact with the pole frame.

2. In a wheeled body having a stub tongue to which a pole frame is connected by a vertical pivot, the combination therewith of a truck comprising an axle and supporting wheels, a rotatable member pivotally connecting said axle with the stub tongue and pole frame and cooperating with the latter to steer the truck by lateral swinging movement of the pole frame, said axle mounted on said member on a horizontal pivot and tiltable laterally of the line of draft, a rockable member mounted on the rotatable member, arms extending in opposite directions from the rockable member, and flexible means connecting said arms with the axle whereby said member rocks simultaneously with the tilting movement of the axle and limits the tilting movement thereof by contact with the pole frame.

3. In a wheeled body having a stub tongue to which a pole frame is connected by a vertical pivot, the combination therewith of a truck comprising an axle and supporting wheels, a rotatable member pivotally connecting said axle with the stub tongue and pole frame and cooperating with the latter to steer the truck by lateral swinging movement of the pole frame, said axle mounted on said member on a horizontal pivot and tiltable laterally of the line of draft, a rockable member mounted on the rotatable member and having a limited rocking movement thereon, arms extending in opposite directions from the rockable member, flexible connections attached to each of said arms and to the axle and operating to rock said member a limited distance simultaneously with the tilting movement of the axle, and means to vary the length of one of said connections.

4. In a wheeled body having a stub tongue to which a pole frame is connected by a vertical pivot, the combination therewith of a truck comprising an axle and supporting wheels, a vertically disposed crank member having parallel arms located respectively above and below the pole frame and connected by a vertical part journaled in a bearing on the pole frame, the upper arm terminating in a vertical part journaled in a bearing on the stub tongue, a sleeve turnably mounted on the lower arm and rigidly secured to the axle, a rockable member mounted on the upper arm and having a limited movement thereon, arms extending in opposite directions from the rockable member, and flexible connections from the axle to the arms of said rockable member.

WILBUR J. COULTAS.
EASBORN RUSCO.